(12) United States Patent
Iseki

(10) Patent No.: US 6,491,347 B2
(45) Date of Patent: Dec. 10, 2002

(54) WEBBING INSERTION MEMBER

(75) Inventor: Hideo Iseki, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/835,844

(22) Filed: Apr. 17, 2001

(65) Prior Publication Data

US 2001/0043006 A1 Nov. 22, 2001

(30) Foreign Application Priority Data

Apr. 27, 2000 (JP) ........................................ 2000-128016

(51) Int. Cl.[7] ................................................ A47B 97/00
(52) U.S. Cl. ................ 297/463.1; 297/463.1; 297/483; 297/482; 280/808; 280/801.1
(58) Field of Search .............................. 297/463.1, 468, 297/482, 483; 280/808, 801.1

(56) References Cited

U.S. PATENT DOCUMENTS

| | | | |
|---|---|---|---|
| 4,378,947 A | | 4/1983 | Foehl |
| 4,527,313 A | | 7/1985 | Sylven et al. |
| 5,601,311 A | * | 2/1997 | Pfeiffer et al. ........... 280/801.1 |
| 6,315,328 B1 | * | 11/2001 | Iseki et al. ................. 280/808 |
| 6,382,672 B1 | * | 5/2002 | Minami et al. .......... 280/801.1 |

FOREIGN PATENT DOCUMENTS

DE    30 10 194    9/1981

* cited by examiner

Primary Examiner—Anthony D. Barfield
Assistant Examiner—Erika Garrett
(74) Attorney, Agent, or Firm—Kanesaka & Takeuchi

(57) ABSTRACT

A webbing insertion member is formed of a metal body having a through opening with an edge, a slip piece attached to the edge of the through opening for allowing a webbing to pass through the through opening above the slip piece, and a molding resin for fixing the slip piece to the metal body. A first engaging member is formed on one of the metal body and the slip piece, and a second engaging member is formed on the other of the metal body and the slip piece and engages the first engaging member so that the slip piece is securely engaged with the metal body.

7 Claims, 4 Drawing Sheets

Fig. 4(a)
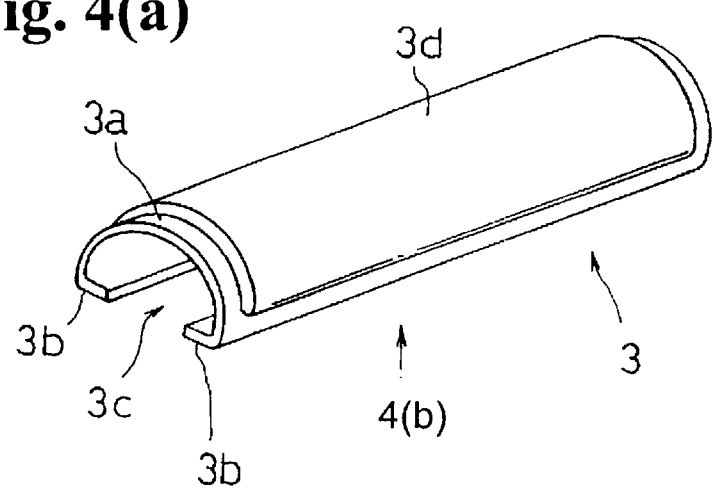
Fig. 4(b)
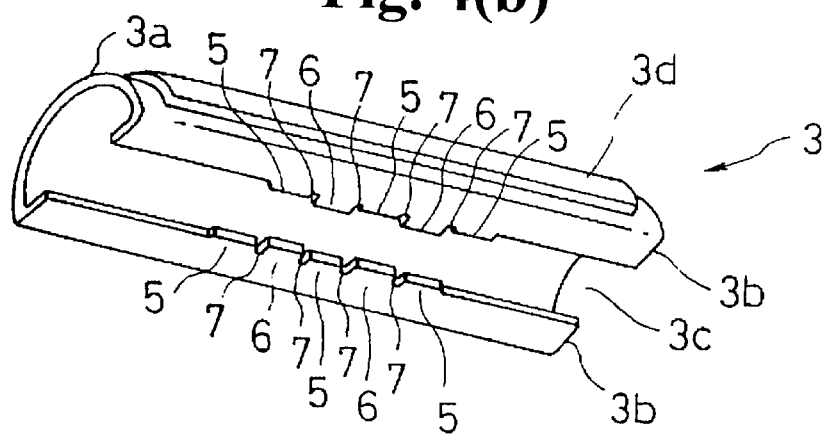
Fig. 4(c)
Fig. 4(d)
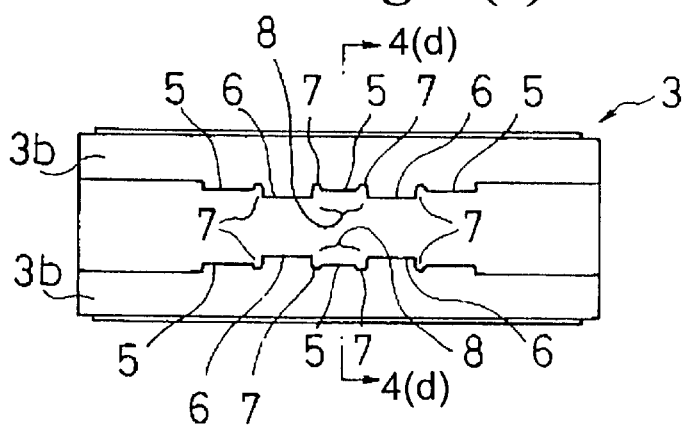

WEBBING INSERTION MEMBER

BACKGROUND OF THE INVENTION AND RELATED ART STATEMENT

The present invention relates to a webbing insertion member, such as a deflection fitting or shoulder anchor, for a shoulder webbing of a seat belt device.

As well known in the art, a seat belt device is installed in a high-speed vehicle, such as automobile and aircraft, for protecting an occupant by means of a webbing. For example, as for a seat belt device for a front seat of an automobile, the webbing is hooked by a deflection fitting or shoulder anchor disposed on a B-pillar of the automobile.

A deflection fitting of a known type comprises a plate-like metal body made of metal, a slip piece attached to the metal body, and a synthetic resin mold covering the metal body and the slip piece together.

The metal body has a bolt hole formed in an upper portion thereof for installation to the B-pillar and a webbing through opening formed in a lower portion thereof.

The slip piece has a groove in which an edge portion of the through opening is fitted, and a curved surface for guiding the webbing.

In a state that the edge portion of the webbing through opening is covered by the slip piece, the synthetic resin mold is formed by insert molding, thereby manufacturing a deflection fitting. The synthetic resin may be polyamide, such as nylon.

The deflection fitting employing such a slip piece has a problem that the slip piece easily slides off or comes off the metal body due to adverse factors, such as vibration, when the metal body with the slip piece is set in a mold for injection molding, especially in case of using an automatic molding apparatus.

It is an object of the present invention to provide a webbing insertion member with a structure for fixing a slip piece and a metal body and preventing the slip piece from sliding off the metal body even with adverse factors, such as vibration.

SUMMARY OF THE INVENTION

A webbing insertion member or shoulder anchor of the present invention has an opening through which a webbing is inserted. The webbing insertion member comprises a metal body formed with a through opening, a slip piece attached to an edge of the through opening, and a molding resin for fixing the slip piece to the metal body. In the webbing insertion member, one of the metal body and the slip piece has a first engaging member or convexity thereon, and the other of the metal body and the slip piece has a second engaging member, i.e. concavity or hole, engaging the first engaging member.

In the webbing insertion member of the present invention, since the convexity formed on one of the metal body and the slip piece is fitted in the concavity or hole formed in the other one, and the convexity is designed to hardly come off the concavity, there is no possibility that the slip piece slides off or comes off the metal body even with adverse factors, such as vibration, after the slip piece is attached to the metal body until the resin molding is completed.

BRIEF DESCRIPTION OF THE DRAWINGS

FIG. 4(a) is a perspective view showing a slip piece of the deflection fitting shown in FIG. 1; FIG. 4(b) is a perspective view of the slip piece from an arrow 4(b) in FIG. 4(a); FIG. 4(c) is a bottom view of the slip piece; and FIG. 4(d) is a sectional view taken along line 4(d) in FIG. 4(c)

DETAILED DESCRIPTION OF THE PREFERRED EMBODIMENTS

Hereinafter, an embodiment of the present invention will be described with reference to FIG. 1 through FIG. 5.

Figure 1:
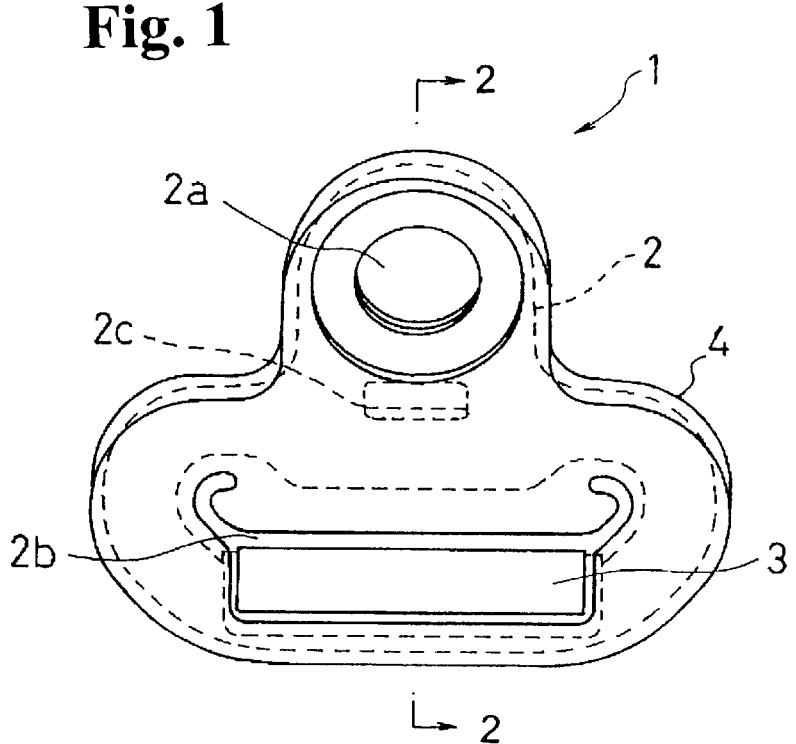
FIG. 1 is a front view of a deflection fitting for a shoulder webbing as a webbing insertion member according to an embodiment of the present invention.
Figure 2:
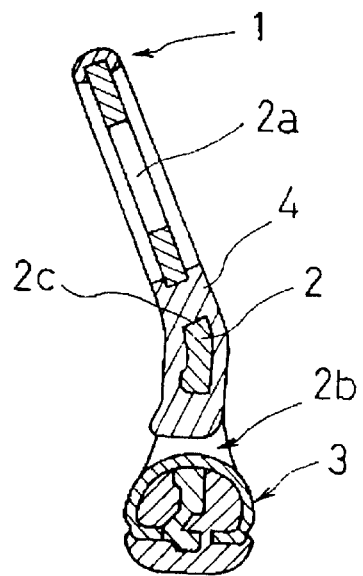
FIG. 2 is a sectional view of the deflection fitting taken along line 2—2 in FIG. 1.
Figure 3A:
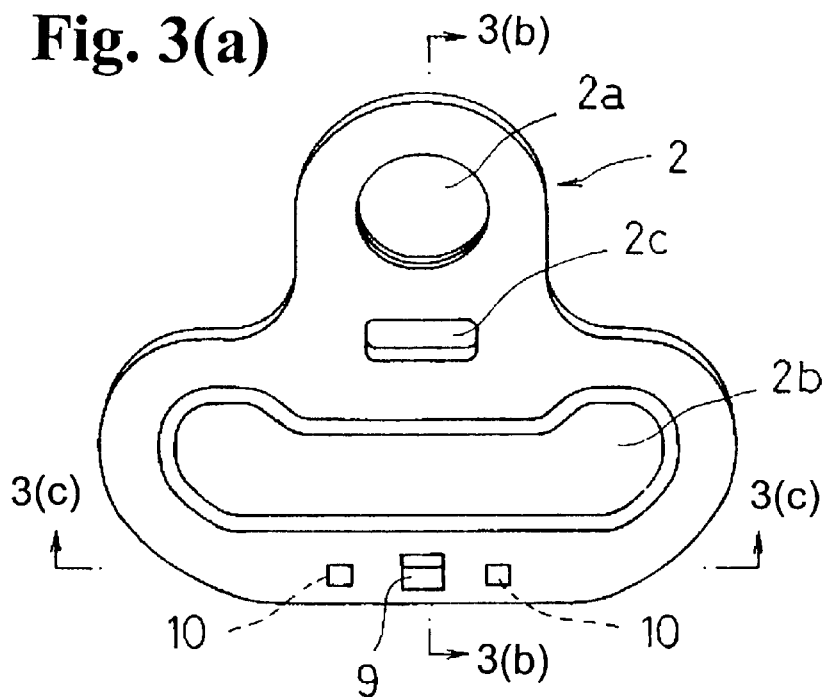
FIG. 3(a) is an explanatory view showing a structure of a metal body of the deflection fitting shown in FIG. 1.
Figure 3B:
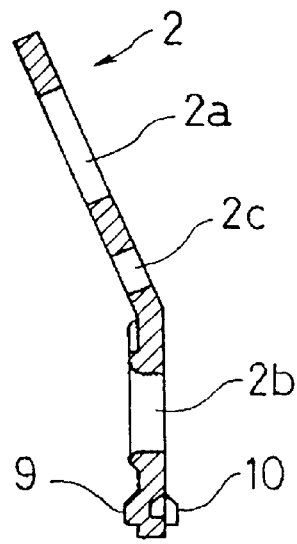
FIG. 3(b) is a sectional view taken along line 3(b)—3(b) in FIG. 3(a)
Figure 3C:
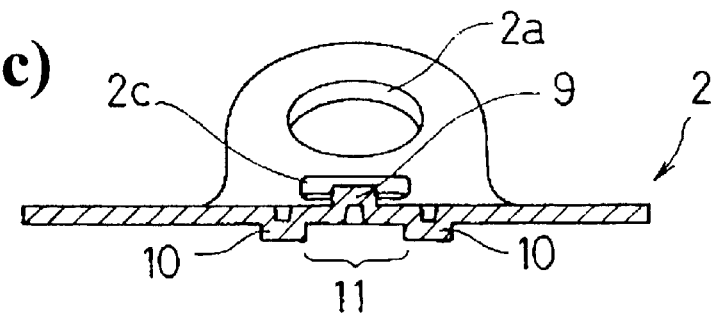
FIG. 3(c) is a sectional view taken along line 3(c)—3(c) in FIG. 3(a)
Figure 5A:
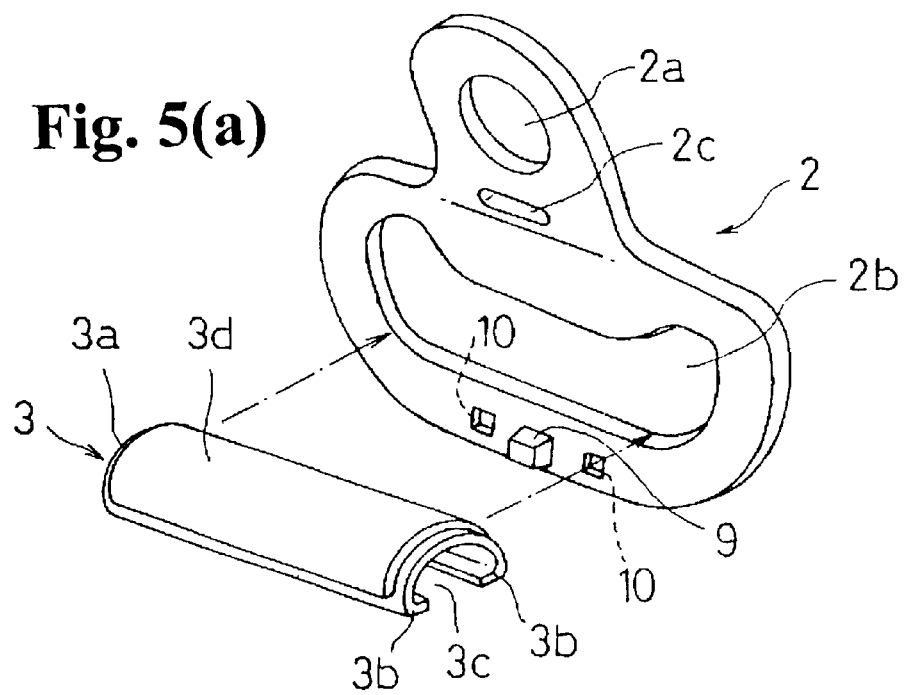
FIGS. 5(a)–5(c) are explanatory views of the slip piece and the metal body, illustrating the engagement therebetween.
Figure 5B:
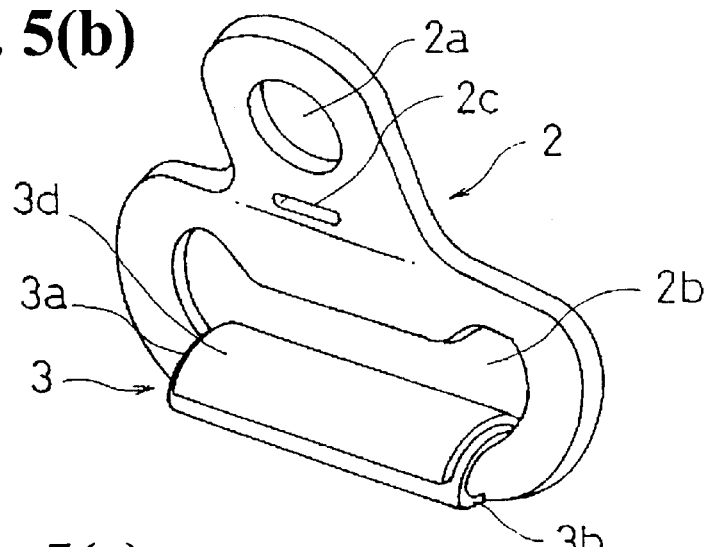
Figure 5C:
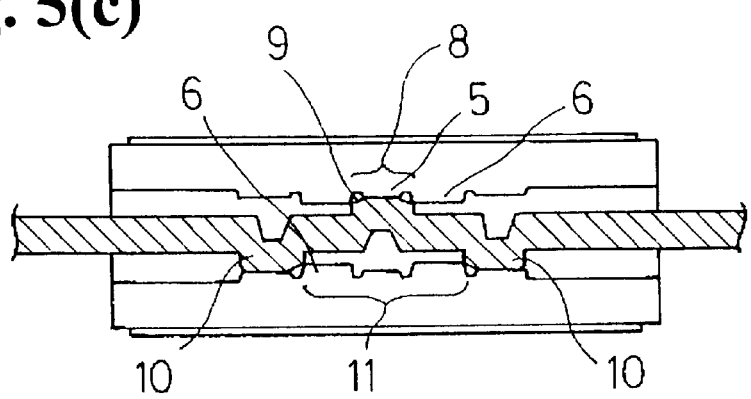

FIG. 1 is a front view of a deflection fitting for a shoulder webbing as a webbing insertion member according to the embodiment of the present invention; FIG. 2 is a sectional view taken along line 2—2 in FIG. 1; FIGS. 3(a)–3(c) are explanatory views showing the configuration of a metal body of the deflection fitting; FIGS. 4(a)–4(d) are explanatory views showing the configuration of a slip piece, and FIGS. 5(a)–5(c) are explanatory views showing the engagement between the slip piece and the metal body. In detail, FIG. 3(a) is a front view of the metal body of the deflection fitting; FIG. 3(b) is a sectional view taken along line 3(b)—3(b) in FIG. 3(a); FIG. 3(c) is a sectional view taken along line 3(c)—3(c) in FIG. 3(a); FIG. 4(a) is a perspective view of the slip piece; FIG. 4(b) is a perspective view taken from a direction of arrow B; FIG. 4(c) is a bottom view of the slip piece; FIG. 4(d) is a sectional view taken along line 4(d)—4(d) in FIG. 4(c); FIG. 5(a) is an exploded perspective view showing the metal body and the slip piece; FIG. 5(b) is a perspective view showing the metal body in a state that the slip piece is attached thereto; and FIG. 5(c) is a sectional view of main parts of the main body and the slip piece, illustrating the engagement therebetween.

A deflection fitting or shoulder anchor 1 comprises a plate-like metal body 2 made of metal, a slip piece 3 attached to the body 2, and a synthetic resin mold 4.

The metal body 2 has a bolt hole 2a formed in an upper portion thereof for installation to the B-pillar, and a webbing through opening 2b formed in a lower portion thereof. The metal body 2 also has a through hole 2c for allowing communication between both surfaces of the metal body 2. The synthetic resin mold 4 enters the through hole 2c so as to increase the strength of connection between the synthetic resin mold 4 and the metal body 2.

The slip piece 3 is made of metal or elastic material, such as synthetic resin, and is formed in a semi-cylindrical shape having a C-like section. The slip piece includes a curved surface 3a at an upper surface, and inward flanges 3b formed at both lower edges of the curved surface 3a along the longitudinal direction. The inward flanges 3b extend in the directions close to each other. Defined between the inward flanges 3b is a groove 3c into which an edge of the through opening 2b is fitted. The slip piece 3 also has a ridge portion 3d for sliding the webbing thereon, extending on the curved surface 3a from both lower edges of the slip piece 3. When the slip piece 3 is attached to the metal body 2 and the metal body 2 with the slip piece 3 is covered by the resin mold 4, the ridge portion 3d is not covered by the resin mold 4 to be exposed for forming a sliding portion for the webbing along the edge of the through opening 2b.

As shown in FIG. 4(c), formed on a middle portion of the edge, confronting the groove 3c, of each of the inward flanges 3b are small projections 5 and large projections 6 projecting toward the other inward flange 3b, wherein the small projections 5 and the large projections 6 are alternatively arranged. Boundaries between the small projections 5 and the large projections 6 are recesses 7, for allowing the large projections 6 to slightly and elastically move in the longitudinal direction of the slip piece 3.

In this embodiment, two of the large projections 6 are provided for each inward flange 3b. Formed between the large projections 6 is a concavity 8 which includes the recesses 7 and the small projection 5 between the large projections 6. A convexity 9, described later, of the metal body 2 is fitted into the concavity 8. In the state before the slip piece 3 is attached to the metal body 2, the width of the concavity 8 (distance between respective sides, facing each other, of the large projections 6 with the small projection 5 interposed therebetween) is slightly smaller than the width of the convexity 9. A pair of large projections 6, with a small projection 5 interposed therebetween, of the other inward flange 3b are fitted in a concavity 11, described later, of the metal body 2 in such a manner that the large projections 6 are sandwiched between the convexities 10, also described later, of the metal body 2. The distance between oppositely facing respective sides of the pair of the large projections 6, with the small projection 5 interposed therebetween, (respective outer sides, coming in contact with the respective convexities 10, of the pair of large projections 6) is slightly larger than the width of the concavity 11.

The inward flanges 3b are symmetrical about the groove 3c so that the small projections 5 and large projections 6 formed on the respective inward flanges 3b are formed in identical configurations, respectively, and are arranged to face the corresponding ones. The distance between the respective tops of the corresponding large projections 6 is slightly smaller than the distance between the oppositely facing respective tops of the convexities 9, 10 through the thickness of the metal body 2.

The slip piece 3 is attached to the lower edge of the through opening 2b of the metal body 2 in such a manner that the lower edge of the through opening 2b enters the groove 3c of the slip piece 3.

As shown in FIGS. 3(a)–3(c), the metal body 2 has the convexities 9, 10 on both surfaces of a lower end portion below the through opening 2b thereof at portions corresponding to the inward flanges 3b when the slip piece 3 is attached. In this embodiment, one convexity 9 is formed on the front surface of the metal body 2, and two convexities 10 are formed at a predetermined distance away from each other on the rear surface of the metal body 2. The pair of convexities 10 on the rear surface of the metal body 2 defines the concavity 11 therebetween. When the slip piece 3 is attached to the metal body 2, the convexity 9 is fitted into the concavity 8 of one of the inward flanges 3b and the concavity 11 fits with the pair of large projections 6 of the other of the inward flanges 3b.

The width of the convexity 9 is slightly larger than the width of the concavity 8 of the slip piece 3 while the width of the concavity 11 is smaller than the space between the oppositely facing respective sides of the projections 6 with the small projection 5 interposed therebetween. The distance between the respective tops of the convexities 9 and 10 through the thickness of the metal body 2 is slightly larger than the distance between the tops of the corresponding large projections 6 with the groove 3c interposed therebetween. Accordingly, when the slip piece 3 is attached to the metal body 2, the convexity of the metal body 2 is pressed into the concavity 8 of one of the inward flanges 3b while the pair of large projections 6 of the other of the inward flanges 3b is pressed into the concavity 11 of the main body 2, because of the elasticity of the slip piece 3. During this, the large projections 6 on both sides of the concavity 8 of the one inward flange 3b elastically move in the directions apart from each other along the longitudinal direction of the slip piece 3, whereby the concavity 8 receives the convexity 9 of the metal body 2.

On the other hand, the large projections 6 of the other inward flange 3b move in directions close to each other along the longitudinal direction of the slip piece 3, whereby the large projections 6 are inserted into the concavity 11. The large projections 6 on both sides of the concavity 8 receiving the convexity 9 bias the convexity 9 from both sides, while the large projections 6 inserted in the concavity 11 bias the convexities 10 on both sides of the concavity 11 outwardly, whereby the respective convexities hardly come off the respective concavities. As a result of this, the slip piece 3 is prevented from sliding off or coming off the metal body 2 even with adverse factors, such as vibration, after being attached to the metal body 2.

After the slip piece 3 is attached to the lower edge of the webbing through an opening 2b of the metal body 2, the insert molding is conducted to form the synthetic resin mold 4, thereby making the deflection fitting. The synthetic resin may be polyamide, such as nylon. Since the slip piece 3 is securely fixed to the metal body 2 as mentioned above, there is no possibility that the slip piece 3 slides off or comes off the metal body 2 due to adverse factors, such as vibration, caused by transportation into the mold for injection molding, after the slip piece 3 is attached to the metal body 2 until the insert molding is finished, thereby manufacturing the deflection fitting in which the molding is achieved with the slip piece 3 securely placed in a desired position.

As described above, according to the webbing insertion member of the present invention, for example, a deflection fitting as the webbing insertion has a metal body, and a slip piece to be attached to an edge of a webbing through opening of the metal body.

One of the metal body and the slip piece has a convexity (or concavity) and the other of the metal body and the slip piece has a concavity (or convexity) for receiving the above convexity, i.e. fitted in the above concavity. The convexity is fitted into the concavity when the slip piece is attached. The configuration is designed such that the convexity hardly comes off the concavity, thereby preventing the slip piece from sliding off or coming off the metal body even with adverse factors, such as vibration, after being attached to the metal body. Therefore, even when the deflection fitting is manufactured by an automatic molding apparatus, the slip piece never slides off or comes off, thereby securely manufacturing the deflection fitting in which the resin molding is made with the slip piece placed in a desired position.

While the invention has been explained with reference to the specific embodiment of the invention, the explanation is illustrative and the invention is limited only by the appended claims.

What is claimed is:

1. A webbing insertion member, comprising:
   a metal body having a through opening with an edge, a slip piece attached to the edge of the through opening for allowing a webbing to pass through the through opening above the slip piece, a first engaging member formed on one of the metal body and the slip piece, a second engaging member formed on the other of the metal body and the slip piece and directly engaging the first engaging member so that the slip piece is securely engaged with the metal body, and a molding resin covering the metal body and a part of the slip piece so that when the molding resin is applied onto the metal body and the slip piece, the slip piece is firmly directly fixed to the metal body.

2. A webbing insertion member according to claim 1, wherein said first engaging member is a convexity, and said second engaging member is a concavity or hole.

3. A webbing insertion member according to claim 1, wherein said first engaging member has a plurality of convexities formed on two sides of the metal body near the through opening, and said second engaging member has a plurality of convexities and concavities formed on two sides of the slip piece.

4. A webbing insertion member according to claim 3, wherein said slip piece includes a ridge portion disposed in the through opening, and two inward flanges facing a part of the metal body, said second engaging member being formed on the two inward flanges.

5. A webbing insertion member according to claim 4, wherein said second engaging member formed on the two inward flanges is arranged symmetrically with respect to a plane therebetween.

6. A webbing insertion member according to claim 5, wherein said first engaging member has one first convexity on one side and two first convexities on the other side with a space therebetween, and said second engaging member has two second convexities and one second concavity between the two second convexities on each side thereof, said two second convexities at one side holding therebetween said one first convexity and said two second convexities at the other side holding therebetween said two first convexities.

7. A webbing insertion member according to claim 1, wherein when said slip piece is attached to the metal body by engaging the first and second engaging members, a space is formed between the slip piece and a part of the metal body to which the slip piece is attached, said molding resin being filled in the space.

\* \* \* \* \*